T. J. McKEONE.
DRAIN PIPE POCKET.
APPLICATION FILED SEPT. 1, 1915.
1,240,747.
Patented Sept. 18, 1917.
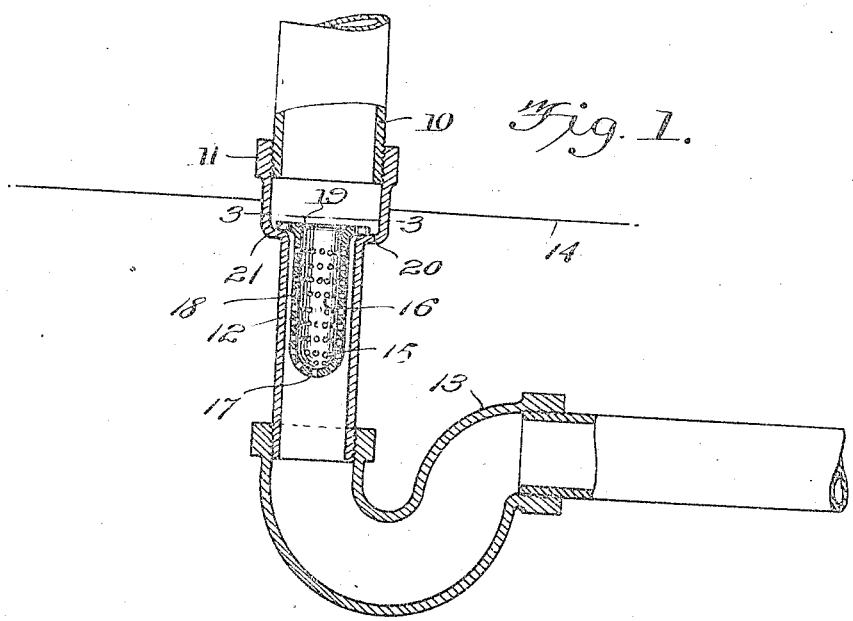
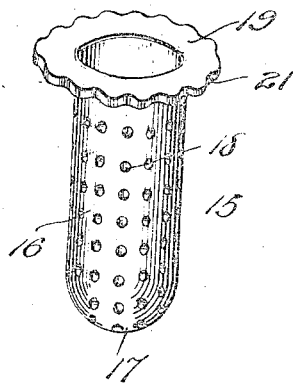
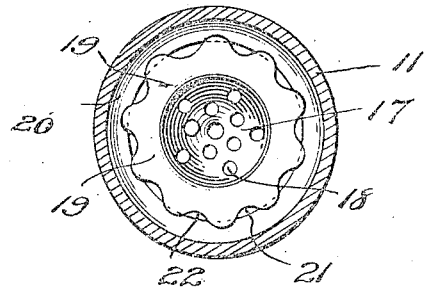
Witnesses
W. S. McDowell
A. F. Stevens
Inventor
T. J. McKeone,
By Victor J. Evans
Attorney

UNITED STATES PATENT OFFICE.

THOMAS J. McKEONE, OF PHILADELPHIA, PENNSYLVANIA.

DRAIN-PIPE POCKET.

1,240,747.

Specification of Letters Patent. Patented Sept. 18, 1917.

Application filed September 1, 1915. Serial No. 48,495.

*To all whom it may concern:*

Be it known that I, THOMAS J. MCKEONE, a citizen of the United States, residing at Philadelphia, in the county of Philadelphia and State of Pennsylvania, have invented new and useful Improvements in Drain-Pipe Pockets, of which the following is a specification.

The invention relates to pockets for drain or waste pipes and the like and has for an object the provision of a pocket for collecting foreign matter passing through or into a drain, waste or other pipe, without necessarily restricting the flow of fluid through the pipe.

Among other features the invention comprehends a proportion of size between the pocket and the particular pipe into which the pocket is fitted so that the waste water or other fluid will not be dammed or materially obstructed in its flow.

Still further objects of the invention reside in a pocket of simple construction, which is preferably made integral and which can be readily secured in the desired relation to the pipe for which it is intended.

In the further disclosure of the invention reference is to be had to the accompanying drawings, constituting a part of this specification, in which similar characters of reference denote corresponding parts in all the views, and in which:—

Figure 1 is a fragmentary vertical sectional view taken through a waste pipe and trap, showing my device applied, Fig. 2 is a perspective view of the pocket, and Fig. 3 is a horizontal sectional view taken on the line 3—3 in Fig. 1.

Referring more particularly to the views I disclose a waste pipe 10 connecting with a head 11 of a coupling pipe 12 associated with the usual trap 13, said coupling pipe constituting, in fact a continuation of the drain or waste pipe 10 and with which the coupling pipe is associated at the ground level 14.

The pocket, indicated by the numeral 15, consists primarily of a cylindrical body 16, having a preferably curved bottom 17 and provided with numerous perforations or openings 18, in the side and bottom. An annular flange 19 is formed with the upper open end of the body 16 and provides for the dependence of the body in the coupling pipe 12 as shown in Fig. 1. To this end the head 11 is formed with a seat 20, receiving the flange 19 and as clearly set forth in Fig. 2, and also in Figs. 1 and 3, the flange 19 is formed with scallops 21, providing small openings 22.

In practice the pocket is arranged as shown in Fig. 1 and it will be noted that the body 16 is entirely spaced from the wall of the coupling pipe into which it depends, the said body being dependingly supported by the flange 19. Now it will be clear that foreign matter passing into the pipe 12 with the fluid from the drain pipe 10, will be caught in and lodge in the pocket, the openings 18 being too small to permit of the passage of the foreign matter out of the pocket with the fluid. The openings 22 are also too small for the foreign matter to pass through but permit small quantities of waste water or fluid, flowing down the side of the drain pipe, to readily flow unhindered into the coupling pipe.

As mentioned heretofore the pocket 15 is made proportional to the size of the coupling pipe, so that when a pipe of a certain diameter and length is ordinarily used when no pocket is employed, the pipes in the present instance will be of increased size to accommodate the flow of water or fluid. With this feature of the construction the damming of the waste water will be prevented, while the pocket, disposed in the pipe 12, as shown and described, will prevent obstacles or other foreign matter from passing into and clogging up the trap 13.

By having the pocket 15 associated with the pipe 12 at the ground level 14, it will be clear that the pocket can be easily and quickly removed for the purpose of clearing out the same, without necessitating the digging up of the ground, the breaking away of any cement or the removal of the trap and component parts.

I claim:—

In combination with a vertically arranged pipe having a diametrically enlarged head at the upper end, providing an annular seat, a vertically arranged pocket in and of less diameter than said pipe, said pocket having a perforated wall and being provided at the upper open end with an outwardly extending annular flange which bears on said seat and suspends and supports the pocket, said flange having a scalloped outer edge providing openings between the seat and the wall of the pocket and permitting the pocket to be readily lifted.

In testimony whereof I affix my signature.

THOMAS J. McKEONE.